United States Patent [19]
Jones

[11] 3,771,748
[45] Nov. 13, 1973

[54] STRUCTURES

[75] Inventor: Michael Weston Jones, Droitwich, Worcestershire, England

[73] Assignee: Imperial Metal Industries (Kynoch) Ltd., Birmingham, England

[22] Filed: Oct. 10, 1972

[21] Appl. No.: 296,230

Related U.S. Application Data

[63] Continuation of Ser. No. 1,073, Jan. 5, 1970, abandoned.

[52] U.S. Cl.................. 244/123, 52/615, 161/68, 244/119
[51] Int. Cl. ............................................. B64c 3/20
[58] Field of Search.................. 244/119, 123, 131; 52/615, 650; 161/68, 69; 156/299

[56] References Cited
UNITED STATES PATENTS

| 2,540,482 | 2/1951 | Hervey | 244/123 |
| 3,667,984 | 6/1972 | Adams | 161/68 UX |
| 2,316,622 | 4/1943 | Richard | 244/119 |
| 3,145,000 | 8/1964 | Mackie | 244/123 |
| 2,720,949 | 10/1955 | Pajak | 161/69 X |
| 3,416,750 | 12/1968 | Young | 161/68 X |

Primary Examiner—Milton Buchler
Assistant Examiner—Galen L. Barefoot
Attorney—Akin T. Davis

[57] ABSTRACT

A multi-cell structure, for example an aircraft wing, comprising polygonal support members or spines and panel members bonded to the spines so that a median plane of a panel member intersects one side of a spine and the panel member is bonded to two other sides of the spine.

4 Claims, 3 Drawing Figures

STRUCTURES

This is a continuation of application Ser. No. 1,073 filed Jan. 5, 1970, now abandoned.

BACKGROUND OF THE INVENTION

This invention relates to structures which must withstand stress imposed therein by bending, shearing, torque or tensile loads or combinations thereof.

A typical example of a structure which has to withstand such stresses is an aircraft wing which, especially during landing and take-off of the aircraft, is subjected to complex stresses. For instance, twisting moments are applied to the wing by the reaction of the ailerons against atmospheric air; bending moments arise from the cantilever arrangement of the wing with respect to the aircraft fuselage; and direct loads may be applied by undercarriage assemblies and fuel tanks, etc. located in the wing. Also during flight stresses are imposed by the rolling, pitching and yawing of the aircraft.

Usually lightweight structures are made by welding together tubular or other suitably sectioned frame members, or by bolting together the frame members with the aid of angle brackets.

If fibre-reinforced plastics materials could be employed, bonded surfaces would have a high resistance to shear stress, i.e. tangential to said surfaces, but would be relatively weak in tension when components of force are exerted in a direction normal to the bonded surfaces and consequently the bonded surfaces would tend to peel apart, particularly if low modulus material is used. If bolts or rivets, etc. are utilised in the structure, the necessary holes and the presence of stressed cut edges seriously reduce the static and fatigue strength of the structure.

SUMMARY OF THE INVENTION

According to the present invention a structure for withstanding stresses imposed therein by bending, shearing, torque or tensile loads or combinations thereof comprises at least one support member of which the outer surface is polygonal so as to have a plurality of planar sides, and a plurality of panel members, a median plane of each panel member intersecting one of said planar sides which is intermediate two other planar sides, each panel member being bonded to said two other planar sides so that the median plane of each panel member forms an angle greater than 90° with one of said other planar sides, and forms an angle of between 90° and 180° inclusive with the remaining said other planar side.

Preferably the median plane of each panel member forms an angle greater than 90° with both of said other planar sides.

In a preferred arrangement, the median plane of each panel member is normal to said intermediate planar side.

The panel members may themselves have extensions integrally formed therewith for bonding to said two other planar sides, or additional tie members may be provided to connect the panel members with said two other planar sides.

If required, the structure may comprise a plurality of support members each having an outer surface which is polygonal so as to have a plurality of planar sides, and a plurality of panel members, the median plane of each panel member intersecting one planar side which is intermediate two other planar sides of a support member, the respective panel member being bonded to said other planar sides, and at least one panel member being connected to each two adjacent support members to connect them together.

Each panel member may comprise two parallel walls and extensions of the walls which diverge from one another in the vicinity of a support member, each extension being bonded to one of said two other planar sides of the support member.

In accordance with the invention also, a structure for withstanding stresses imposed therein by bending, shearing, torque or tensile loads or combinations thereof comprises at least one support member of which the outer surface is polygonal and a plurality of shell members, each shell member having with respect to the longitudinal axis of the support member, a radially inner flat wall and a radially outer wall, and two opposed flat walls connecting the longitudinally extending edges of the radially inner and outer walls, the radially inner flat wall of each shell member being bonded to one of two planar sides which extend at opposite edges of an intermediate planar side of the support member, the opposed flat walls of adjoining shell members being bonded together to form corresponding panel members, each of which extends from a respective intermediate planar side.

Preferably each panel member formed by adjoining shell members is normal to its respective said intermediate planar side of an associated support member.

The walls of each panel member may be spaced from one another by an intermediate layer of metal honeycomb or rigid plastics foam. The metal honeycomb may be secured to the support member by a layer of foamed adhesive.

The support member may be hollow with its interior either vacant or provided with a core of foamed plastics, elastomeric material, or other suitable filler material to provide additional stiffness or to provide a damping medium.

The support member and shell members may be made, for example, from glass reinforced plastics material or carbon fibre reinforced plastics material.

The invention also consists in a method of manufacturing a structure for withstanding stresses imposed therein by bending, shearing, torque or tensile load or combinations thereof, comprising, forming a support member of which the outer surface is polygonal so as to have a plurality of planar sides, forming a plurality of shell members, each shell member comprising with respect to the longitudinal axis of the support member, a radially inner flat wall and a radially outer wall, and two opposed flat walls connecting the longitudinally extending edges of the radially inner and outer walls, disposing said shell members around the support member so that the radially inner flat surfaces locate against planar sides of the support member and adjacent flat walls of adjoining shell members are parallel so as to form panel members, each of which extends from intermediate planar sides of the support member, securing the radially inner flat surfaces of the shell members to the support member, and securing the adjacent flat walls of adjoining shell members to one another.

BRIEF DESCRIPTION OF THE DRAWINGS

In order that the present invention may be more clearly understood three embodiments of the invention will now be described, with reference to the accompanying drawings in which.

DESCRIPTION OF THE PREFERRED EMBODIMENTS

Figure 1:
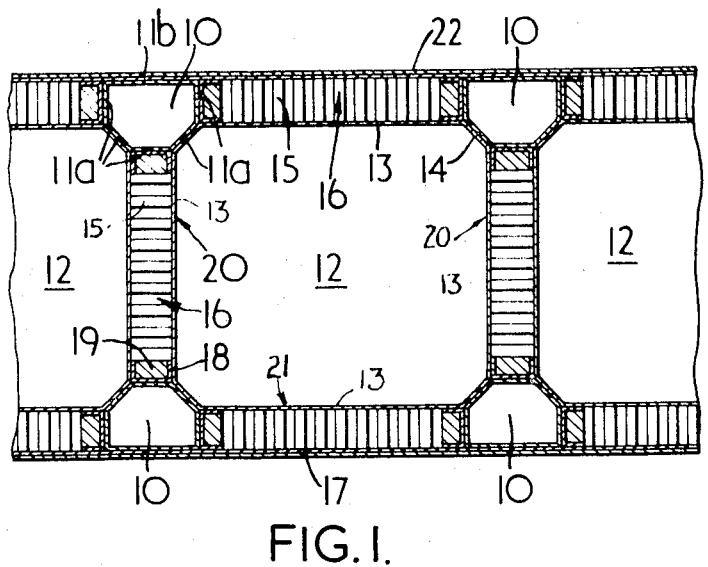
FIGS. 1 and 2 are lateral sectional views of part of an aircraft wing according to a first and second embodiment, respectively.

Referring to FIG. 1 of the drawings, a structure for an aircraft wing comprises a plurality of hollow support members 10 of which four are shown in the drawing arranged in vertically aligned pairs spaced apart across the wing, each support member extending in a direction along the length of the wing. Each support member 10 in lateral cross-section is polygonal so as to present an outer surface having a plurality of planar sides 11a,11b. In this first embodiment, each support member 10 has six planar sides of which five, denoted by numeral 11a, are of equal width and the sixth, denoted by numeral 11b is of greater width and faces externally of the structure. The hollow interior of each support member 10 is left vacant.

Between each group of four support members, there is arranged a series of shell members 12, each of generally rectangular shape and comprising flat walls 13, adjacent walls of each shell member being connected together by narrow walls 14 forming an angle of 45° with the associated walls 13. The width of each narrow wall 14 is approximately the same as that of the planar sides 11a of the support members.

The support members 10 and shell members 12 are manufactured in the following manner. Sheets of carbon fibre laid in unidirectional manner are impregnated with an epoxy novalac resin, hardener and acetone mixture, comprising:

| | |
|---|---|
| 40 parts by weight of resin LY558 | available from |
| 1.5 parts by weight of hardener BF$_3$-400 | CIBA (A.R.L.) Ltd. |
| 60 parts by weight of acetone | |

The solvent is then driven off by heating at 100°C in a suitable oven.

The appropriate number of sheets of unidirectional carbon fibre are laid up onto respective complementarily shaped metal mandrels, in the required fibre pattern, and the assemblies are cocooned in a layer of polytetrafluoroethylene, a bleed cloth to absorb surplus resin solution and a rubber bag. The assembly is then submitted to an autoclave cycle of 2 hours at 165°C and 70–80 p.s.i. Whilst the support members and shell members are still on their mandrels they are post-cured for 2 hours at 180°C. The mandrels are then extracted from the members.

To fabricate the structure the required number of support members 10 and shell members 12 are assembled in a suitable jig, a narrow wall 14 being located in contact with a corresponding planar side 11a of a support member, and opposed flat walls 13 of adjoining shells 12 disposed parallel to but spaced from one another to provide therebetween a cavity 15 into which a layer of aluminium honeycomb 16 is inserted. The upper and lower outer surfaces of the structure are provided by layers 17 of carbon fibre skin which are spaced from the upper and lower walls 13 of the shell members to provide further cavities 15 for the insertion of aluminium honeycomb 16, the layers 17 extending over and being disposed against the planar sides 11b of support members 10.

Each layer of honeycomb 16 is secured between two channels 18 by means of foamed adhesive 19 which also serves to stiffen the edge of the layer of honeycomb 16.

The shell members are bonded to the support members by a film adhesive, typically of a type denoted BSL308 and available from CIBA (A.R.L.) Ltd. The adhesive is applied to the surfaces to be bonded prior to assembly. The adhesive bond is cured at 165°/175°C for one hour. The bonding jig is designed to exert adequate pressure over the total bond area.

Thus opposed vertical flat walls 13 of adjoining shell members 12 together with the intervening honeycomb 16 constitute vertical panel members 20. Similarly, the horizontal flat walls 13 and layers 17 together with the intervening honeycomb 16 constitute horizontal panel members 21. Furthermore, the narrow walls 14 and the portions of the layers 17 which are bonded to support members may be considered as extensions of the walls 13 and which diverge from one another at the support members. Thus each panel member interconnects two adjacent support members. In the structure of FIG. 1, each shell member 12, in relation to the longitudinal axis of one associated support member 10, comprises a radially inner flat wall 14 bonded to the member, and a diagonally opposite and radially outer flat wall 14 bonded to another support member.

It will be clear from FIG. 1 that a median plane of each panel member 20,21 intersects one planar side 11a which is intermediate two other planar sides of a support member 10 and that each panel member is bonded to said two other planar sides.

It will also be evident from FIG. 1 that the median plane of each panel member forms an angle greater than 90° with each of the two respective planar sides to which the panel member is secured.

In the manufacture of an aircraft wing, the usual skin 22 is applied over the above structure.

In use of an aircraft wing based on the above structural arrangement, tensile forces induced in the walls 13 during the various phases of aircraft movement are transmitted to the support members 10. Such forces are distributed across the bonded surfaces of the narrow walls 14 of the shell members 12, and the respective planar sides 11a of the support members 10 to cause a reaction in shear stress across the whole area of the respective planar sides 11a, rather than tensile stresses liable to produce peeling. The absence of bolts or rivets in the structure avoids structural discontinuities by eliminating cut edges formed by holes or slots along the narrow walls 14 and planar sides 11a, and avoids concentrated loading points, the adhesive bond promoting a uniform distribution of stress.

In a modification the hollow support members 10 may have their interiors filled, for instance, with a core of elastomeric material to assist in damping out vibration.

Figure 2:
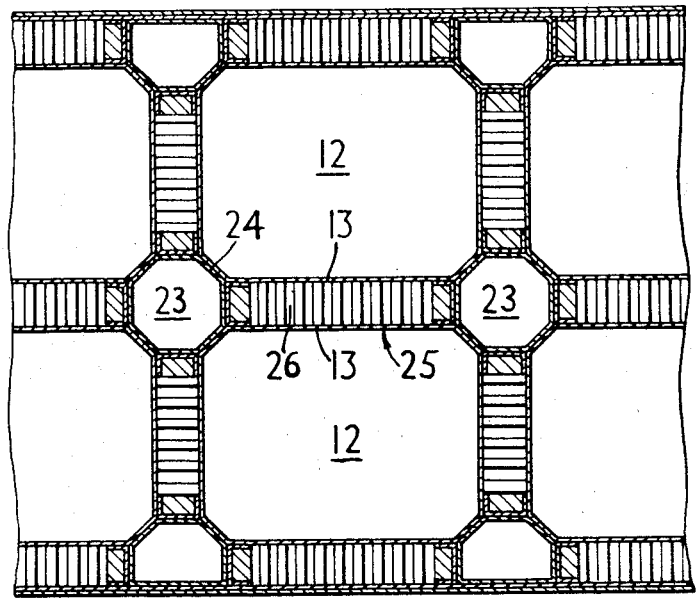

In a second embodiment, shown in FIG. 2, a structure for an aircraft wing is similar to that of the first embodiment in that it comprises hollow support members 10 and shell members 12 as described in the first embodiment. However, in this second embodiment upper and lower layers of shell members are provided and intermediate the two layers there are disposed a plurality of hollow regular octagonal support members 23 each presenting an outer surface having planar sides 24.

It will be apparent from an inspection of FIG. 2 of the drawing that the structure is also assembled in a similar manner to that described in the first embodiment except that additional intermediate panel members 25 are provided by sandwiching a layer of aluminium honeycomb 26 between flat walls 13 of adjacent upper and lower shell members 12.

Figure 3:
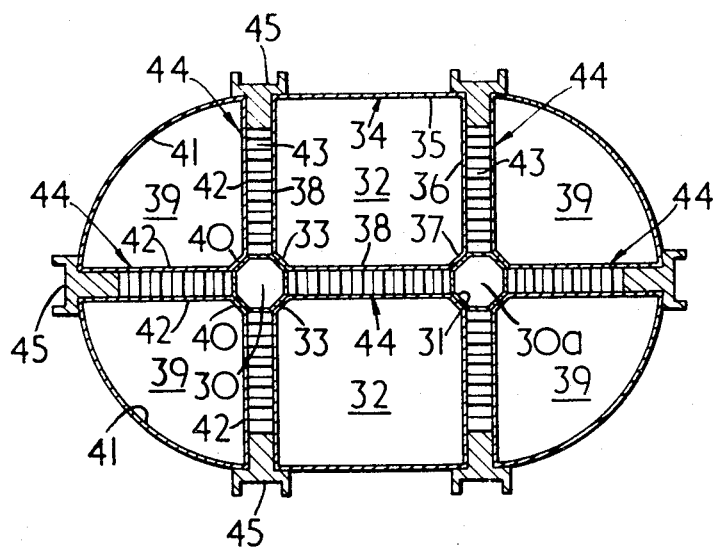
FIG. 3 is a diagrammatic plan view of a satellite structure according to a third embodiment of the invention.

A third embodiment illustrated in FIG. 3 relates to a satellite structure which, in flight, is subject to centrifugal forces and consequent tensile loads imposed by spinning of the structure. In this satellite structure two hollow octagonal support members 30, 30a each have eight planar sides 31. Each of two substantially rectangular shell members 32 comprises, for instance, with respect to the support member 30, a radially inner flat wall 33, and a radially outer wall 34, the latter being constituted by three distinct parts denoted respectively 35, 36 and 37. The longitudinally extending edges of the radially inner and outer walls are connected together by two flat walls 38. Four shell members 39, each in the shape of a quadrant and comprising a radially inner flat wall 40, a radially outer curved wall 41 and flat walls 42, are disposed two at each side of the pair of shell members 32, the radially inner flat wall 40 of each shell member 39 being bonded to a respective planar side 31 which is intermediate two other planar sides of a support member 30, 30a. Honeycomb structure 43 is sandwiched between and bonded to opposed walls of adjoining shell members to provide panel members 44, and paddle hinge brackets 45 are inserted in appropriate panel members as required for hingedly mounting solar paddles (not shown) to the structure.

From FIG. 3 it will be seen that each octagonal support member 30, 30a has four shell members bonded to alternate planar sides and that four panel members 44 extend normal to the remaining intermediate planar sides of each support member, the central panel member interconnecting the two support members 30, 30a.

In any of the above embodiments, the metal honeycomb may be replaced by plastics honeycomb made with "Nome" (Registered Trade Mark) paper.

Alternatively, the walls of the panel members may be spaced from, and bonded to one another by rigid plastics foam.

I claim:

1. A stress bearing structure for flight vehicles, the structure comprising at least one elongated beam-like support member of polygonal lateral cross-section such that the outer surface has a plurality of planar sides each of which is intermediate other planar sides, a plurality of shell members, each shell member being of unitary construction and having, with respect to the longitudinal axis of said at least one support member, a radially inner flat wall and a radially outer wall, and a flat wall connecting each longitudinally extending edge of the radially inner wall with a respective longitudinally extending edge of a radially outer wall to form a closed quadrilateral figure, the radially inner flat wall of each shell member being bonded to a respective one of said other planar sides of the support member, the arrangement being such that the opposed connecting flat walls of adjoining shell members are parallel one to the other and are bonded together to form corresponding panel members each of which extends from a respective one of said intermediate planar sides of the support member.

2. A structure according to claim 1 wherein each panel member formed by adjoining shell members is normal to its respective said intermediate planar side of an associated support member.

3. A structure according to claim 1 wherein the support members and the shell members are made from glass reinforced plastics material.

4. A structure according to claim 1 wherein the support members and the shell members are made from carbon fibre reinforced plastics material.

* * * * *

UNITED STATES PATENT OFFICE
CERTIFICATE OF CORRECTION

Patent No. 3,771,748      Dated November 13, 1973

Inventor(s) Michael Weston Jones

It is certified that error appears in the above-identified patent and that said Letters Patent are hereby corrected as shown below:

In the heading, line 30 was omitted and should appear as follows:

[30] Foreign Application Priority Data

Jan. 20, 1969    Great Britian    3135/69

Signed and sealed this 9th day of April 1974.

(SEAL)
Attest:

EDWARD M. FLETCHER, JR.
Attesting Officer

C. MARSHALL DANN
Commissioner of Patents